US012674272B1

(12) United States Patent
Alipour et al.

(10) Patent No.: US 12,674,272 B1
(45) Date of Patent: Jul. 7, 2026

(54) MODULAR WORK STATION

(71) Applicant: Unovo, LLC, San Francisco, CA (US)

(72) Inventors: Ehsan Alipour, San Rafael, CA (US);
Stephen Jones, Mt.Pleasant, SC (US);
Joseph Benjamin Strecker, Half Moon
Bay, CA (US)

(73) Assignee: Unovo, LLC, Richmond, CA (US)

( * ) Notice: Subject to any disclaimer, the term of this
patent is extended or adjusted under 35
U.S.C. 154(b) by 299 days.

(21) Appl. No.: 18/463,024

(22) Filed: Sep. 7, 2023

Related U.S. Application Data

(60) Provisional application No. 63/404,882, filed on Sep.
8, 2022.

(51) Int. Cl.
| | |
|---|---|
| *D06F 81/10* | (2006.01) |
| *D06F 81/00* | (2006.01) |
| *F21V 33/00* | (2006.01) |
| *G01B 3/04* | (2006.01) |

(52) U.S. Cl.
CPC ............ *D06F 81/10* (2013.01); *D06F 81/003*
(2013.01); *F21V 33/0024* (2013.01); *G01B
3/04* (2013.01)

(58) Field of Classification Search
CPC ........ D06F 81/02; D06F 81/10; D06F 81/003;
D06F 81/00
USPC .......................................................... 223/37
See application file for complete search history.

(56) References Cited

U.S. PATENT DOCUMENTS

| | | | | |
|---|---|---|---|---|
| 2,939,232 | A * | 6/1960 | Munson | D06F 81/10 |
| | | | | 38/139 |
| 4,464,853 | A * | 8/1984 | Mattesky | D06F 81/10 |
| | | | | 38/138 |
| 6,814,269 | B1 * | 11/2004 | Fernandez | D06F 89/005 |
| | | | | 223/37 |
| 11,155,957 | B2 | 10/2021 | Alipour | |
| 2007/0204492 | A1 * | 9/2007 | He | D06F 81/10 |
| | | | | 38/138 |

OTHER PUBLICATIONS

Screen copy of Internet web page at address https://www.amazon.
com/Rdutuok-Pressing-Quilting-Quilters-Projects/dp/B0834C12WF/
ref=sr_1_6?keywords=rdutuok%2Bwool%2Bpressing%2Bmat%
2Bfor%2Bquilting%2Bironing&qid=1697567597&sr=8-6&th=1
"Rdutuok 17×13.5 inches wool pressing mat . . . ", author and
original publication date unknown.

* cited by examiner

*Primary Examiner* — Nathan E Durham
(74) *Attorney, Agent, or Firm* — Adam Warwick Bell;
Matthew Rupert Kaser

(57) ABSTRACT

A mat for pressing articles with a steam iron is configured
for connection to additional units of the mat by a mat
connector having ribbed posts positioned to engage acces-
sory apertures in each mat. Connected mats form a com-
bined work surface without gaps, channels, or apertures
formed along the edges and corners of adjacent mats. Each
mat may be made from a textile including wool fibers to
facilitate passage of steam and dry air through the work
surface.

10 Claims, 8 Drawing Sheets

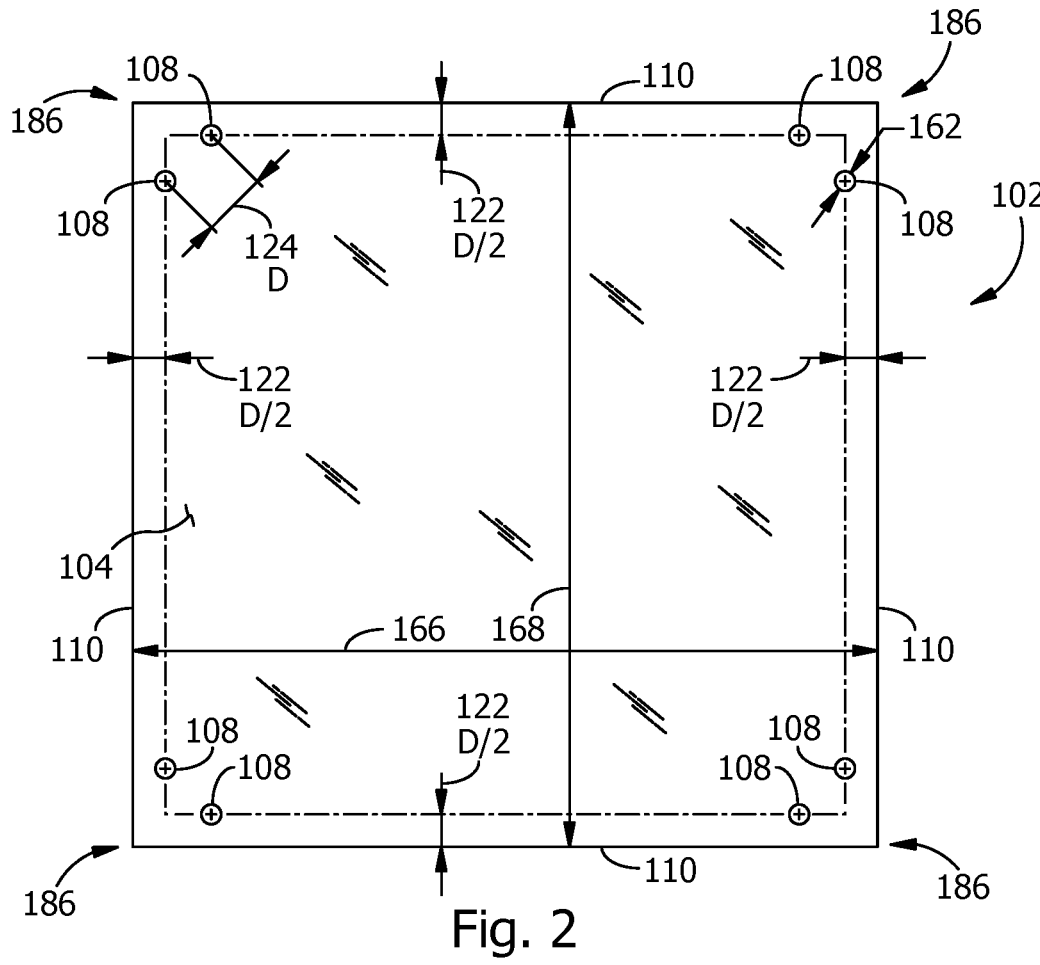
Fig. 2
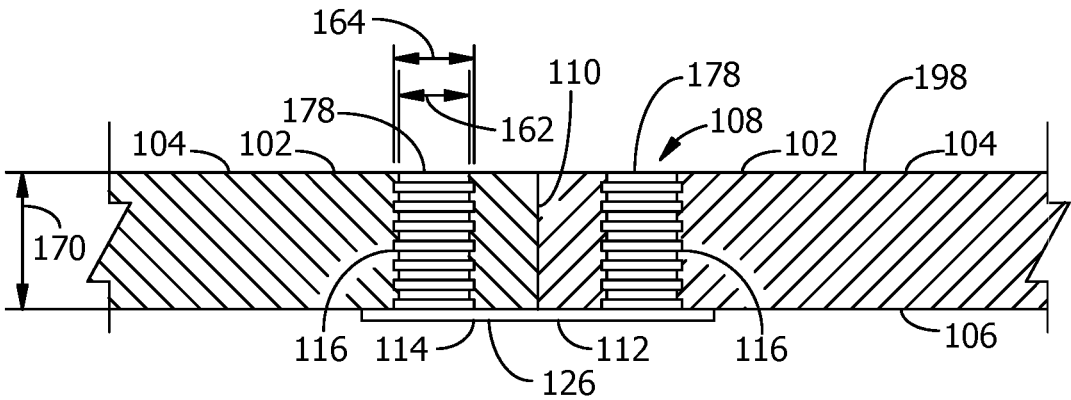
Fig. 3  SECTION A - A

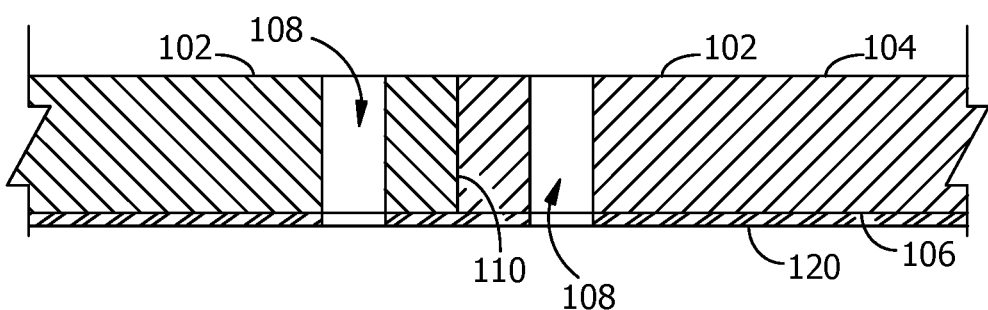
Fig. 4  ALTERNATIVE SECTION A - A
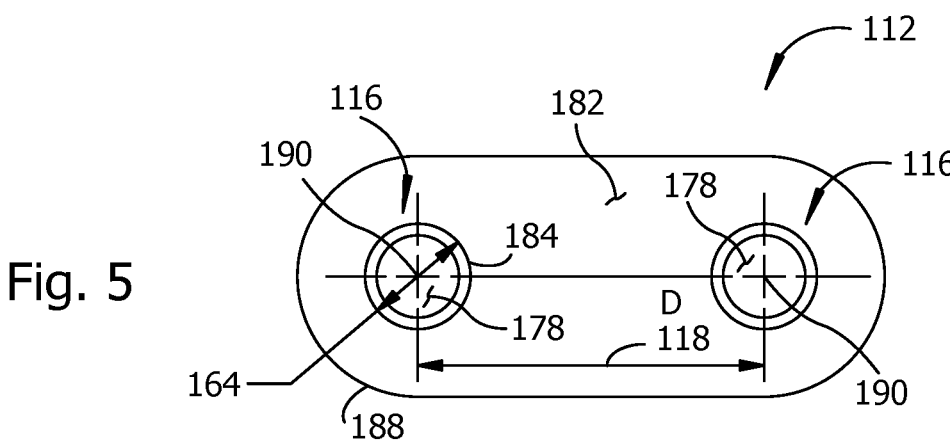
Fig. 5
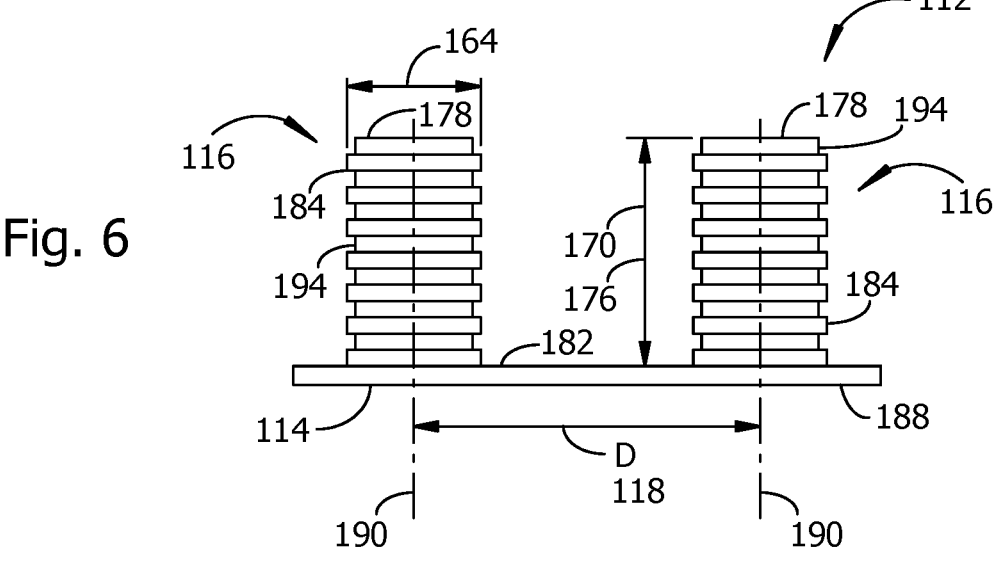
Fig. 6

MODULAR WORK STATION

FIELD OF THE INVENTION

Embodiments are related to pressing pads and ironing boards for supporting fabrics while removing wrinkles and forming creases with a steam iron.

BACKGROUND

A steam iron may be configured as a handheld electric appliance with a polished sole plate capable of being heated to a sufficiently high temperature to transform liquid water into pressurized water vapor. The sole plate may be formed with one or more steam vents through which hot water vapor may be directed onto an article being pressed. The heated sole plate of the steam iron may be held against the article to remove wrinkles, form a crease, or fuse other materials to the article.

An ironing board and/or ironing pad may be used to support an article being pressed with a steam iron. An ironing board may be configured as a narrow table, possibly including a fabric cover. An ironing pad may be formed from felted fibers, layers of fabric, or other materials. An ironing board may have dimensions suitable for ironing clothing but may be difficult or inconvenient to use with articles that are substantially smaller or larger than the board surface. It may not be practical or economical to change the size of the work surface of the ironing board without adding extensions that may be difficult to attach, difficult to store, and which could unbalance the ironing board, possibly increasing the risk of the ironing board tipping over.

An ironing pad may be sufficiently flexible that it would ordinarily be placed on a work surface such as a table or countertop before pressing an article against the ironing pad with a steam iron. A large ironing pad may be difficult to store without rolling the pad. It may be necessary to replace a large pad when only a small part of the pad becomes worn from use. A rolled pad may retain a curved work surface when unrolled and may be difficult to flatten sufficiently for ironing or activities such as craft work or sewing. After having been cut for use on a particular work surface, it may not be possible to re-size the pad for other work surfaces. It may be difficult to attach pads to one another to increase the size of a work surface without unwanted gaps or apertures forming between adjacent pads, for example gaps formed between adjacent radiused corners or elongate depressions formed between adjacent radiused or chamfered pad edges. Gaps and depressions may interfere with the intended use of a pad by forming interruptions in a flat work surface. An ironing pad left in contact with a nonporous surface after exposure of the pad to liquid water or steam during ironing may not dry sufficiently quickly to prevent the formation of mildew.

SUMMARY

An example apparatus embodiment includes at least one mat configured to receive a mat connector. An example mat connector includes a connector plate having a mat contact surface; a first ribbed post joined to the mat contact surface; and a second ribbed post joined to the mat contact surface with a separation distance D from the first ribbed post to the second ribbed post. The example mat may be formed as a quadrilateral with four straight edges and four square corners. The example mat includes a work surface extending to the four straight edges and the four square corners and a bottom surface on a side of the mat opposite the work surface.

At each of the four square corners, the example mat further includes a first accessory aperture and a second accessory aperture formed through the work surface and the bottom surface. The first accessory aperture is preferably positioned half of the distance D from one of the straight edges, the second accessory aperture is preferably positioned half of the distance D from an adjacent one of the straight edges, and the first accessory aperture is positioned the distance D from the second accessory aperture. The mat connector is configured for attachment to the mat with the first ribbed post engaged in the first accessory aperture and the second ribbed post engaged in the second accessory aperture, for all of the four square corners.

Some embodiments of the example mat are formed with a thickness dimension in a range from 0.25 inch (6 millimeters) to 1.0 inch (25 millimeters). The example mat may alternatively be formed with a thickness dimension in a range from 0.1 inch (2.5 millimeters) to 2 inches (51 millimeters). The thickness dimension may be selected, for example, to provide a preferred degree of compressibility and resilience in the mat or to influence the permeability of the mat to water vapor. The mat may optionally be formed a length dimension approximately equal to a width dimension, although other proportions may be used. The example mat may optionally be formed from a felt textile. In some example embodiments, the felt textile includes natural wool fibers.

Each of the ribbed posts included in an embodiment has a shank having a flat end opposite an end joined to the mat contact surface; a length dimension from the mat contact surface to the flat end, with the length dimension less than or equal to a thickness dimension of the mat; and a plurality of ribs extending away from the shank. The flat end of each ribbed post attached to a mat connector may be coplanar with the work surface of the mat when the mat contact surface of the example mat connector is in contact with the bottom surface of the mat.

Each of the ribbed posts, for example the first ribbed post and the second ribbed post on a mat connector, further comprise an outer diameter sized for a close sliding fit in the first accessory aperture and the second accessory aperture of the example mat. The first ribbed post and the second ribbed post may alternatively be formed with an outer diameter up to ten percent larger than a diameter of the first accessory aperture.

The example mat includes a first straight edge joined to a second straight edge to form a first square corner, the second straight edge joined to a third straight edge to form a second square corner, the third straight edge joined to a fourth straight edge to form a third square corner, and the fourth straight edge joined to the first straight edge to form a fourth square corner.

The example apparatus embodiment optionally includes more than one of the mats, wherein one of the mats is a first mat and another of the mats is a second mat. The mat connector may be attached to the first mat and the second mat with the mat contact surface of the mat connector in contact with the bottom side of the first mat and the bottom side of the second mat, the first ribbed post of the mat connector engaged in one of the accessory apertures along the first straight edge of the first mat, and the second ribbed post of the mat connector engaged in one of the accessory apertures along the third straight edge of the second mat. When the mat connector is engaged with accessory apertures in the first mat and second mat, the mat connector holds the first mat to the second mat without any gaps between the first mat and the second mat along the first straight edge of the first mat from the second straight edge of the first mat to the fourth straight edge of said first mat.

BRIEF DESCRIPTION OF THE DRAWINGS

FIG. 2 shows a view toward the top surface of one of the mats from FIG. 1.

FIG. 3 shows a cross-sectional view A-A with some details of an example of a mat connector positioned to join two adjacent mats. A location and viewing direction for section A-A is marked with section line A-A in FIG. 1.

FIG. 4 is an alternative cross-sectional view A-A in which adjacent mats are joined to one another by a flexible backing sheet affixed to the mats.

FIG. 5 is a view toward the mat contact surface of an example mat connector.

FIG. 6 is a side view of the example mat connector of FIG. 5.

FIG. 10 is a view toward a top side of the example iron trivet of FIG. 1.

FIG. 11 is a side view of the example iron trivet of FIG. 1 and FIG. 10.

DESCRIPTION

An example apparatus embodiment provides an expandable work surface formed from one or more mats configured to be joined edge-to-edge with one another by thin, flexible mat connectors. The mat connectors included ribbed posts that securely grip the internal surfaces of apertures formed in the mats, with the spacing of the ribbed posts selected to join mats without gaps between the edges and corners of adjacent mats. The mat connectors are easily removed and repositioned to form work surfaces including any desired number of mats and to enable easy disassembly and storage of the mats and connectors.

The mats are preferably formed from a felt textile that is readily permeable to liquid water and water vapor. The felt textile preferably includes a majority fraction of natural wool fibers collected from wool-bearing animals such as, but not limited to, sheep, goats, llamas, and alpacas. Wool from these animals have fibers which bind firmly and to one another and have a natural hydrophobic coating that inhibits water absorption and bacteria growth. The composition of the hydrophobic coating may vary from animal to animal, with the various compositions sometimes collectively referred to as "lanolin" in the context of a greasy or oily coating of natural wool fibers.

As used herein, a felt textile refers to a matted structure formed from tangled fibers pressed together to form a flexible sheet. A felt textile made from wool has a substantial volume fraction of empty air spaces between fibers, allowing water vapor to pass readily through the felt and facilitating thorough drying should the air spaces become filled with liquid water. The air spaces further enhance the thermal insulating properties of the felt textile, an advantage in reducing a potential for heat damage to a support surface upon which the disclosed embodiments of a mat may be placed.

Other advantageous properties of a felt textile made from wool fibers include elasticity, resistance to scorching, and wear resistance. A mat included in the disclosed apparatus may be subjected to substantial compression forces when the mat is used to support an article being pressed with a steam iron. When heat, pressure, and water vapor from the steam iron are removed, the elasticity of wool felt is sufficient to allow the mat to rebound to its original dimensions. Wool, unlike cotton and some other materials, resists scorching when placed in contact with a hand-held portable steam iron operating at a heat setting consistent with routine pressing of clothing, linens, and window coverings to remove wrinkles or form deliberate creases, attachment of articles to one another by thermally-activated fabric adhesives, and so on. Furthermore, textiles made from wool have long been recognized for their excellent resistance to damage from abrasion and repeated folding.

Figure 1:
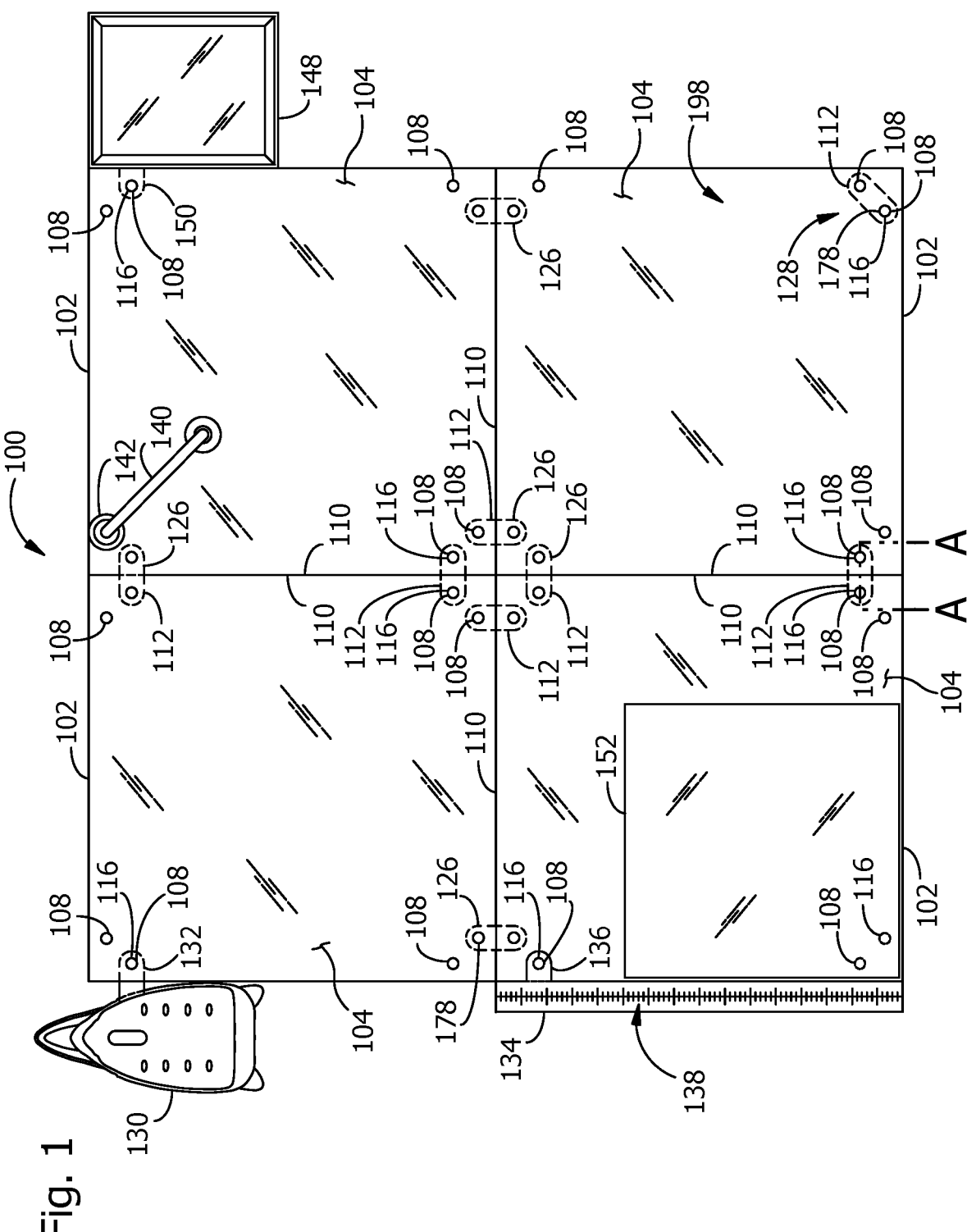
FIG. 1 shows a view toward top surfaces of an example apparatus embodiment including four mats joined along their edges by mat connectors to form a smooth work surface and examples of accessories which may be attached to the mats including an iron trivet, a lamp, a tray, a ruler, and a cut-resistant accessory panel.

An example apparatus embodiment 100, also referred to herein as a modular work station 100, is shown in FIG. 1 in a view toward a combined work surface 198 formed by four mats 102 joined along their edges 110. Although the example of FIG. 1 shows four mats 102 arranged in two rows of two mats each, any selected number of mats may optionally be joined to one another to form a combined work surface that is a different size than in FIG. 1. Or, a single mat 102 may be used without joining it to any other mats 102. The example modular work station 100 is further shown with optional accessories attached to the mats 102, for example a trivet 130 for a steam iron (steam iron not illustrated), a tray 148, a ruler 134, a lamp 140, and an accessory panel 152. The optional accessories may be connected to the mat(s) at other locations than the example locations s in FIG. 1. Any one or more of the optional accessories may be omitted and more than one of any of the accessories may be connected to the modular work station 100.

As suggested in the example of FIG. 1, adjacent mats 102 are preferably connected to one another without gaps between edges 110 and without gaps between square corners 186 along the contacting sides of the mats. Such gaps are undesirable because they could lead to the formation of unwanted wrinkles or creases in an article being pressed against the combined work surface 198, for example by a steam iron. To prevent such gaps and provide for secure assembly, easy disassembly, and flat storage of the mats 102, the modular work station 100 may be provided with at least two mat connectors 112 for each mat. Each mat connector 112 includes two ribbed posts 116 positioned to engage accessory apertures 108 formed in each mat. Mat connectors 112 positioned to connect two mats 102 to one another are illustrated at example locations 126 in FIG. 1, showing that a secure connection between two mats is established by one of the ribbed posts 116 on a mat connector 112 engaged in an accessory aperture 108 on a first mat 102, and the other ribbed post 116 on the same mat connector engaged in another accessory aperture 108 on the second mat 102. When positioned as shown at example locations 126, each mat connector 112 straddles the two opposing edges 110 of the connected mats 102.

Aspects of the modular work station 100 that contribute to secure, gap-free connections between mats are shown in the examples of FIGS. 2-6. FIG. 2 shows a view toward a top surface 104 of an example mat 102. The example mat 102 is formed as a quadrilateral with four straight edges 110 connected to one another at four square corners 186. The top surface 102, also referred to as the work surface 102, extends to all four straight edges 110 and all four square corners 186 and has a length dimension 168 and a width dimension 166 between opposite edges 110. The straight edges 110 are preferably formed with edge rounding or chamfering smaller than 0.1 inch to avoid forming channels large enough to induce wrinkling or creasing of articles pressed against the combined work surface 198 of connected mats 102. Each square corner 186 is preferably formed with a radius of curvature at the corner less than 0.1 inch to avoid forming a gap at adjacent corners between connected mats 102. The square corners 186 are further preferably formed with a ninety-degree angle 200 between the two straight edges 110 that intersect to form each square corner.

A mat 102 formed with a quadrilateral perimeter shape 204 has the advantageous property that, with suitable choices for the lengths of the four edges and angles between the edges, multiple units of the mat when placed edge to edge will fill a planar surface without gaps between the edges. A person familiar with the principles of geometry will understand that other perimeter shapes, with suitable selection of the number and lengths of the sides forming the perimeter shape, are also capable of filling a planar surface without gaps between adjacent edges. Filling a planar surface without gaps may be referred to as tiling the surface. To achieve the preferred gap-free coverage of a planar surface, alternative configurations of a mat 102 may be formed with a perimeter shape corresponding to a polygon including, but not limited to, a parallelogram, a rhombus, a rectangle, a square, a triangle, a pentagon, a hexagon, and an octagon. A modular work station 100 may alternatively be provided with mats of more than one perimeter shape, with mats of different perimeter shapes preferably capable of contacting one another along adjacent edges so as to tile a planar surface without gaps between adjacent mats. Embodiments 100 optionally include mats lacking one or more straight edges, having instead curved edges or segmented edges with projections on some sides and corresponding recesses shaped to receive the projections on other sides. For any choice of perimeter shape, adjacent edges of the mat 102 will preferably meet at a vertex rather than a radiused corner.

Square corners 186 distinguish the example mat embodiments 102 from previously available felt pads manufactured with rounded corners. Unlike a square corner, a rounded corner lacks a unique vertex corresponding to a point of intersection between adjacent sides. Previously available felt pads are often provided with rounded corners having corner radii of at least 0.5 inch. Previously available felt pads not only lack a connector device comparable to the mat connector 102 provided with the disclosed embodiments 100, but because of corner rounding would connect to one another with a substantial gap at each corner if suitable connector devices were available.

As will be explained in more detail with regard to FIG. 5, a preferred spacing of the two ribbed posts 116 on a mat connector 112 may be represented as a separation distance D 118. Preferred locations for accessory apertures 108 on the mat 102 may also be expressed in terms of the distance D 118, as suggested in FIG. 2. Two accessory apertures 108 will preferably be formed near each square corner 186, a first accessory aperture 108 separated from a first straight edge 110 by a distance D/2 122 and a second accessory aperture separated from a second edge 110 also by the distance D/2 122, where the second edge 110 is adjacent the first edge and joins to the first edge 110 at the square corner 186. In addition to the preferred edge spacing D/2, the two accessory apertures near each square corner are preferably separated from one another by the distance D 118. The preferred separation D 118 of two accessory apertures 108 at each corner 186 enables mat connectors to be securely stored on the mat 102 as shown at location 128 in FIG. 1.

Cross-sectional view A-A in FIG. 3 shows some additional aspects of an example embodiment 100. FIG. 3 is representative of locations 126 where a mat connector 112 connects two mats 102 to one another. Each mat 102 has a work surface 104 and a bottom surface 106 on a side of the mat opposite the work surface. When connected together, the planar work surfaces 104 on the two mats are approximately coplanar, forming the planar combined work surface 198. The two ribbed posts 116 included with each mat connector 112 straddle the edges 110 of the two connected mats 102. The two ribbed posts 116 are each preferably formed with a flat end 178 that will be positioned coplanar with the combined work surface 198, or slightly below the combined work surface, when the mat connector 112 is placed against the bottom surface 106 and the ribbed posts are engaged in the accessory apertures 108.

The accessory holes through the mat 102 are formed with a diameter 162, as shown in the examples of FIGS. 2-3. As suggested in the example of FIG. 3, an outer diameter 164 of each ribbed post 116 included on the mat connector 112 and each of the optional accessories (130, 134, 140, 148, 152) is preferably in a range from the diameter 162 of the accessory holes 108 to about ten percent greater than the diameter 162 of the accessory holes. Because of the elasticity of the material of the mat 102, this relationship between post diameter and hole diameter provides a secure grip between the mat and the post while permitting easy removal of the mat connector or accessory from the mat. The secure connection between ribbed post and accessory aperture may be referred to as a close sliding fit.

In an alternative embodiment of a mat 102, two or more mats 102 are connected to one another by a flexible polymer material attached to the back surface 106 of each connected pad. An example embodiment 100 having mats 102 with a flexible backing layer 120 is shown in FIG. 4 in alternative cross-sectional view A-A. The accessory apertures 108 may penetrate the backing layer 120 or alternately stop at the bottom surface 106 of the mat 102 without extending through the backing layer.

FIGS. 5-6 show some features of the example mat connector 112 from the previous figures. The mat connector includes two ribbed posts 116 attached to, or alternately formed integrally with, a mat contact surface 182 on a connector plate 188. Each of the ribbed posts 116 includes a plurality of ribs 184 extending outward from a shank 194. In the illustrated example, the ribs are formed as circumferential projections from the shank, although other rib shapes may be used in alternative configurations of the ribbed post 116. For example, the ribs may alternatively be formed as elongate projections along a length 176 of each shank. The shank is attached at a first end to the mat contact surface 182 of the connector plate 188. A second end of the shank opposite the first end is preferably formed as a flat end 178. The connector plate has a bottom surface 114 on a side opposite the mat contact surface 182.

The length dimension 176 applies to both ribbed posts 116 and is measured from the first end of the shank at the mat contact surface 182 to the flat end 178. The length dimension 176 of the ribbed posts 116 is preferably equal to, or slightly less than, a thickness dimension 170 of the mat 102, as shown for example in FIG. 3. A separation distance between the two ribbed posts 116 on the mat connector 112 is represented in the figures as the separation distance D 118 between two longitudinal centerlines 190, where each of the ribbed posts 116 have one of the two longitudinal centerlines 190.

The connector plate 188 is preferably formed with a thickness dimension 202 that is less than about twenty percent of the thickness dimension 170 of the mat 102. A thin connector plate provides less deflection of the work surface 104 than a thicker connector plate when the mat connector is attached to the bottom side of the mat. At the preferred thickness ratio, the connector plate does not cause wrinkling or creasing of an article pressed against the work surface of an embodiment 100.

Figures 7, 8, 9:
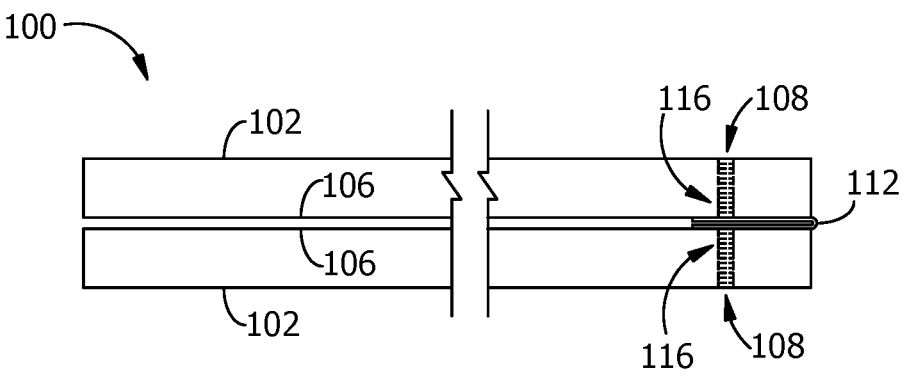
FIG. 7 is a view toward the sides of two mats joined to one another by a mat connector, with the mat connector folded until the back sides of each mat are adjacent to one another.
FIG. 8 is a view toward a top side of the example ruler accessory of FIG. 1.
FIG. 9 is a side view of the example ruler accessory of FIG. 1 and FIG. 8.

The connector plate may optionally be formed from a flexible polymer material that can withstand repeated bending through a small bend radius, for example a bend radius slightly greater than the thickness dimension 202, without the plate cracking or splitting. A mat connector 112 with a sufficiently flexible connector plate enables two mats to be folded flat one atop the other without removing the mat connector, as shown in the example of FIG. 7. In the example of FIG. 7, the mat connector 112 has been bent until the flat top surface 106 of a first mat is parallel the flat top surface 106 of a second mat, enabling the two mats to be stored with flat work surfaces in an area sufficient for one mat. Mats 102 may alternately be stored by removing the mat connectors 112 from at least one of the connected mats and stacking the mats flat one atop the other.

Unlike the disclosed mat embodiments 102 which may be stored without bending the work surfaces 104 of the mats forming the combined work surface 198, previously available felt pads, if sufficiently large, may need to be stored by rolling or folding the pad. A rolled pad may retain considerable surface curvature after being unrolled, possibly reducing the usefulness of the pad for pressing or cutting fabric articles or causing a delay until the curved surface relaxes sufficiently for the intended use.

As suggested in the example of FIG. 1, one or more optional accessories may be included with a modular work station 100 to enhance the utility of the apparatus. FIGS. 8-19 show some details of the optional accessories included with the example apparatus embodiment 100 of FIG. 1.

When the modular work station 100 is to be used for cutting or trimming articles placed on the work surface 104 of a mat 102, the optional ruler 134 of FIGS. 1, 8, and 9 may be attached to a selected edge of the mat 102 to provide dimensional references. The example ruler 134 includes an elongate bar 192 marked on one or more sides with a printed, embossed, or molded measurement scale 138. An integrated mat connector 136 extending outward from the elongate bar includes a ribbed post 116 positioned to engage with an accessory aperture 108 on a mat 102. As suggested in the example of FIG. 1, the integrated mat connector 136 and ribbed post 116 may be positioned to engage an accessory connector by first passing through the work surface 104 of a mat 102. At the discretion of a person using an embodiment 100, the ruler 134 may instead be connected to a mat 102 with the ribbed post 116 first passing through the bottom surface 106 of a mat 102.

Figures 10, 11:
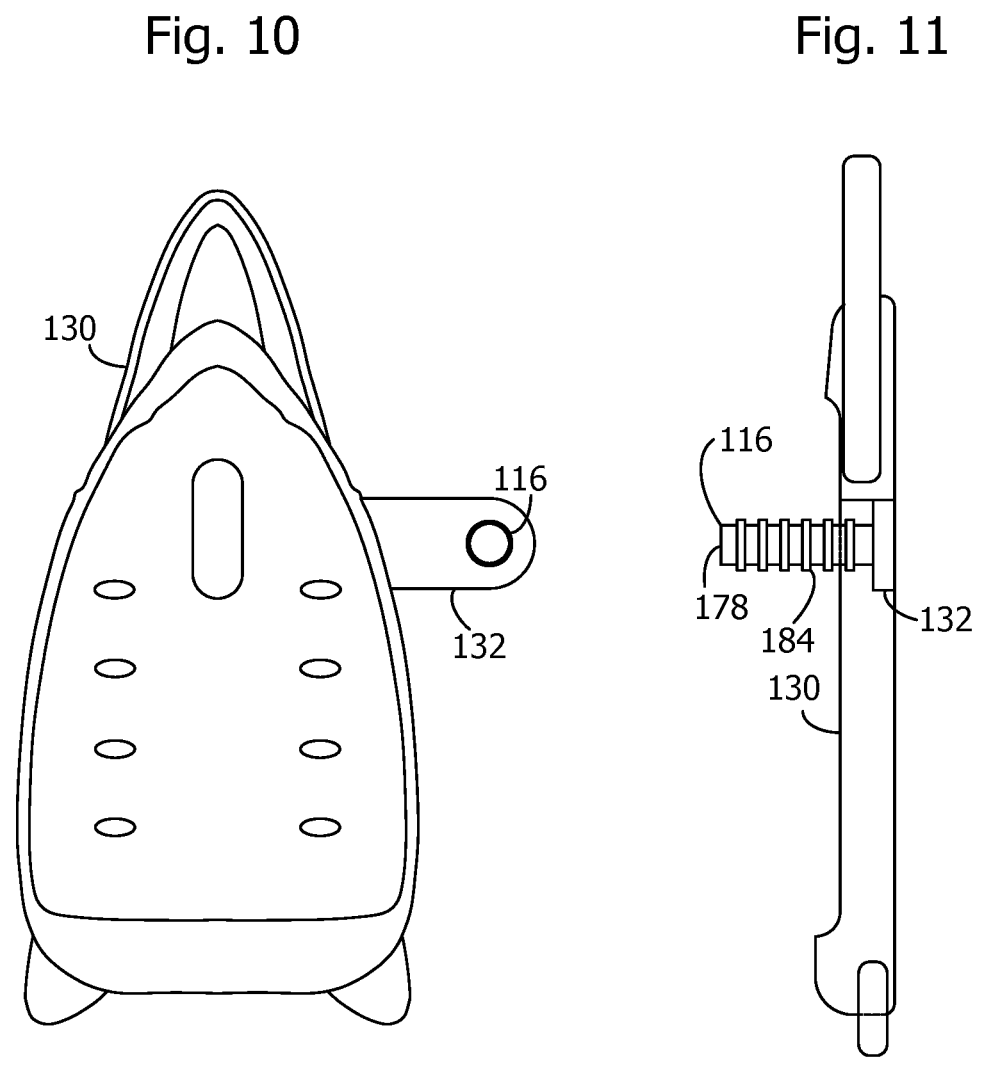

When the modular work station 100 is to be used for pressing articles with a steam iron, the optional example iron trivet 130 of FIGS. 1, 10, and 11 provides a safe and secure resting place for a hot steam iron. An integrated mat connector 132 extending outward from the iron trivet includes a ribbed post 116 positioned to engage with an accessory aperture 108 on a mat 102. Additional features and properties of the example iron trivet 130 may be found in U.S. Pat. No. 11,155,957 to E. Alipour, incorporated herein by reference in its entirety.

Figures 12, 13, 14:
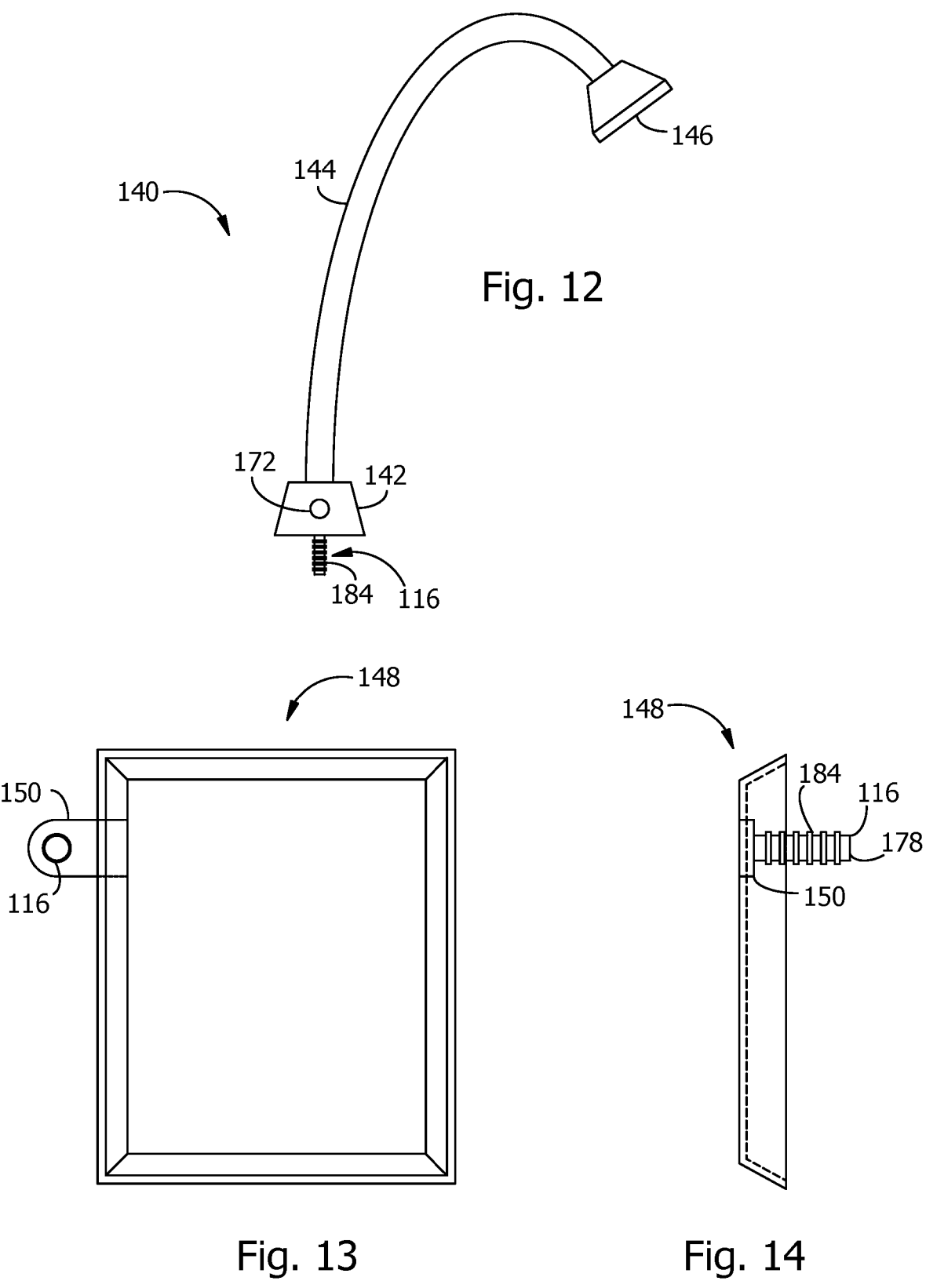
FIG. 12 is a side view of the example lamp of FIG. 1.
FIG. 13 is a view toward the top side of the example tray of FIG. 1.
FIG. 14 is a side view of the example tray of FIG. 1 and FIG. 13.

FIG. 12 is a side view of the optional example lamp 140 of FIG. 1. The example lamp 140 includes a base 142 including a ribbed post 116 positioned to engage an accessory aperture 108 in a mat 104 with the base resting against the top surface 104 of the mat. The example lamp 140 includes a flexible gooseneck 144 attached to the base 142 and a reflector and/or diffuser 146 holding an illumination source such as a light-emitting diode (not shown). The light may be turned on and off with a power switch 172. Electric power may be provided from replaceable or rechargeable batteries (not illustrated) electrically connected to the power switch.

FIGS. 1, 13, and 14 illustrate an example of an optional tray 148 having an integrated mat connector 150 extending out from a side of the tray. The integrated mat connector 150 includes a ribbed post 116 positioned to engage with an accessory aperture 108 on a mat 102. The example tray 148 of FIGS. 1, 13, and 14 is shown with a rectangular perimeter but may alternatively be made with a perimeter formed as a triangle, a square, a semicircle, a curved shape, or other shapes.

Figures 15, 16:
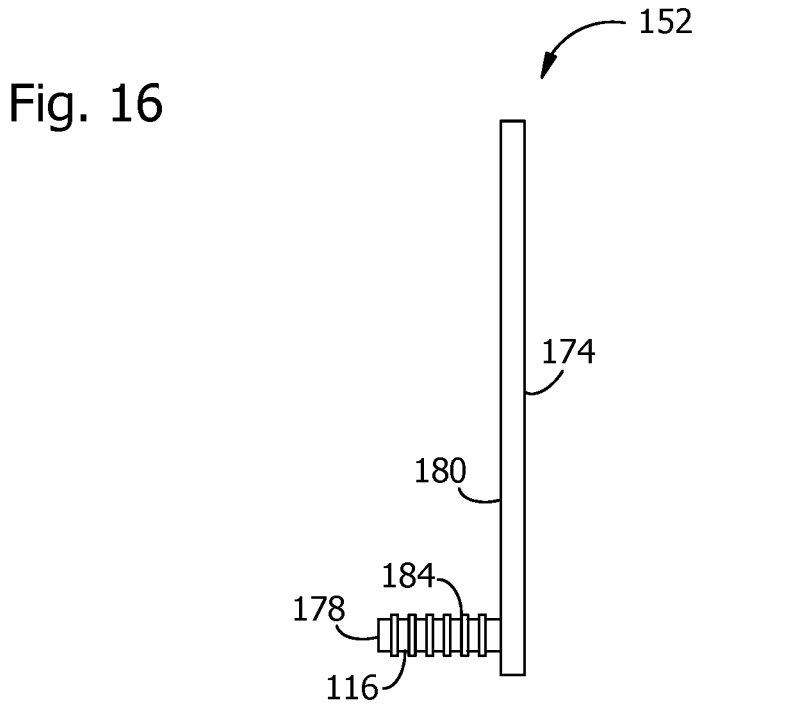
FIG. 15 is a view toward the top side of the example accessory panel of FIG. 1.
FIG. 16 is a side view of the example accessory panel of FIG. 1 and FIG. 15.
Figure 17:
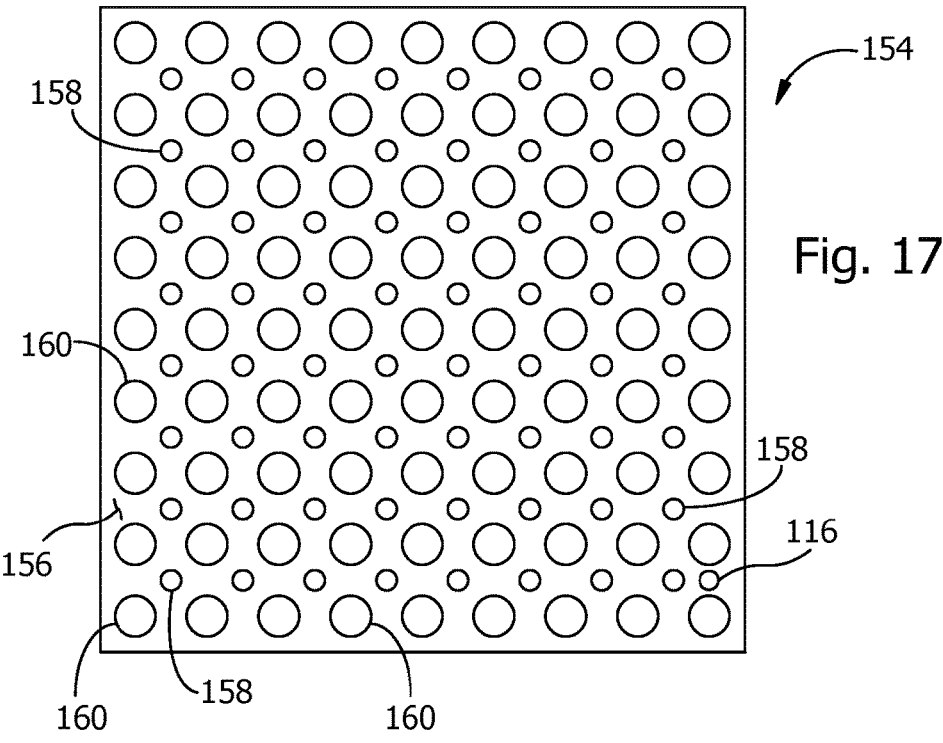
FIG. 17 is a view toward the top side of an example ventilation spacer.
Figure 18:
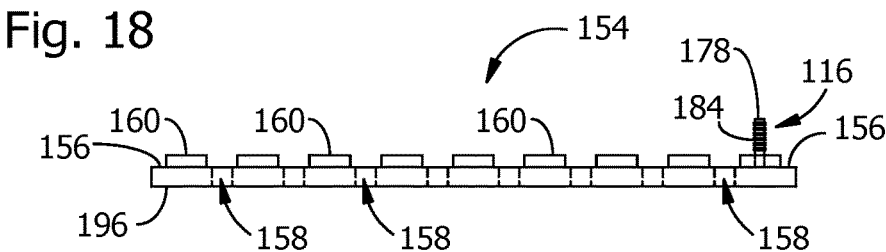
FIG. 18 is a side view of the example ventilation spacer of FIG. 17.
Figure 19:
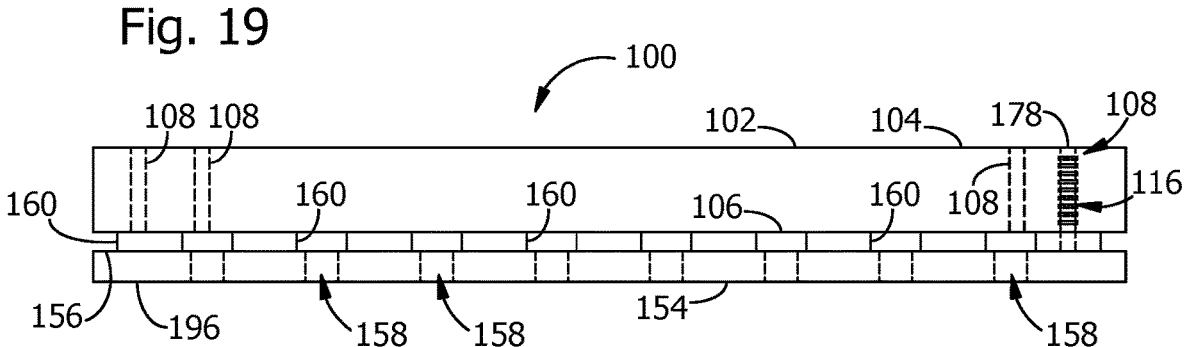
FIG. 19 is a side view of the example ventilation spacer of FIGS. 17-18 and the example mat of the preceding figures.

The work surface 104 of a mat 102 may be used to support an article being cut, trimmed, or marked with scissors, a knife, a sewing tracing wheel, or other sharp or pointed tools. A modular work station 100 optionally includes an accessory panel to protect the work surface 104 from being damaged by cutting or marking using such tools. FIGS. 1, 15, and 16 show an accessory panel 152 optionally included with a modular work station 100. The accessory panel may be made from a polymer such as high-density polyethylene, a composite material, or wood. The accessory panel includes a top surface 174 and a bottom surface 180 on a side opposite the top surface 174. A ribbed post 116 extends outward from the bottom surface 116. The accessory panel 152 may be connected to a mat 102 by engaging the ribbed post 116 on the accessory panel in one of the accessory apertures 108 of a mat 102. A length dimension of the accessory panel 152 may be approximately equal to the length dimension 168 of a mat 102 and a width dimension of the accessory panel may be approximately equal to the width dimension 166 of a mat 102, although accessory panels with other dimensions may alternatively be provided.

Steam emitted from a steam iron pressed against the work surface 104 of a mat 102 may condense and wet the mat or may flow through the mat and damage a support surface under the mat such as a table or countertop. An optional ventilation spacer may be included with a modular work station 100 to protect a surface supporting a mat 102 from thermal damage and water damage, improve the flow of dry air and/or steam through the mat, and enhance drying of the mat. The example ventilation spacer 154 of FIGS. 17, 18, and 19 has a top surface 156 from which many mat support projections 160 extend. Many optional ventilation apertures 158 formed through the top surface 156 extend through a ventilation spacer bottom surface 196. The mat support projections are preferably spaced apart from one another to permit air flow through the spaces between the projections.

A ribbed post 116 extends upward from the ventilation spacer top surface 156. As suggested in the example of FIG. 19, the ventilation spacer 154 is preferably positioned with its ribbed post 116 engaged in an accessory aperture 108 of a mat 102 and with a bottom surface 106 of the mat resting against the many mat support projections 160. The ventilation spacer bottom surface 196 may be placed, for example, against a table top or countertop (not shown) used to support the modular work station 100 during use. Void spaces formed above the ventilation spacer top surface 156, between mat support projections 160, and below the bottom surface 106 of the mat provide an efficient flow path for steam and dry air passing through the mat 102, reducing flow resistance compared to a mat 102 placed on a flat, nonporous surface such as a tabletop.

As used herein, the term "approximately" has the intended meaning "within ten percent of the stated condition." Unless expressly stated otherwise herein, ordinary terms have their corresponding ordinary meanings within the respective contexts of their presentations, and ordinary terms of art have their corresponding regular meanings.

What is claimed is:

1. A modular work station comprising a plurality of polygonal mats configured to be joined adjacent and edge-to-edge with one another by thin, flexible mat connectors;
   wherein each mat comprises a plurality of accessory apertures, each configured to receive one of a plurality of mat connectors; wherein each mat connector comprises:
   a connector plate having a mat contact surface; and two ribbed posts projecting therefrom adapted to engage one of said plurality of accessory apertures;
   wherein said two ribbed posts are spaced apart by a distance D;

and wherein the modular work station is further configured as a quadrilateral with four straight edges and four square corners, comprising:
   a work surface extending to said four straight edges and said four square corners;
   a bottom surface on a side of said modular work station opposite said work surface;
   wherein, at each of said four square corners, two of said accessory apertures are provided, each formed through said work surface and said bottom surface, and each positioned half of said distance D from one of said straight edges;
   and where one of said ribbed posts is attached to an accessory aperture of one of said mats;
   and a second ribbed post is attached to an accessory aperture of another, adjacent mat, so as to form a smooth, expandable work surface without gaps between the edges and corners of adjacent mats.

2. The apparatus of claim 1, wherein each one of said plurality of polygonal mats is formed with a thickness dimension in a range from 0.25 inch (6 millimeters) to 1.0 inch (25 millimeters).

3. The apparatus of claim 1, wherein each one of said plurality of polygonal mats is formed with a length dimension approximately equal to a width dimension.

4. The apparatus of claim 1, wherein each one of said plurality of polygonal mats is formed from a felt textile.

5. The apparatus of claim 4, wherein said felt textile comprises natural wool fibers.

6. The apparatus of claim 1, wherein each of said ribbed posts further includes:
   a shank having a flat end opposite an end joined to said mat contact surface; and
   a length dimension from said mat contact surface to said flat end, said length dimension less than or equal to a thickness dimension of said mat.

7. The apparatus of claim 6, wherein said ribbed posts each further include a plurality of ribs extending away from said shank.

8. The apparatus of claim 6, wherein said flat end of said rib posts are coplanar with said work surface when said mat contact surface is in contact with said bottom surface.

9. The apparatus of claim 1, wherein said ribbed posts each further comprise an outer diameter sized for a close sliding fit in said first accessory aperture and said second accessory aperture.

10. The apparatus of claim 1, wherein said ribbed posts each further comprise an outer diameter up to ten percent larger than a diameter of said first accessory aperture.

* * * * *